United States Patent [19]

Brown

[11] 4,056,050
[45] Nov. 1, 1977

[54] COFFEEMAKER WITH BREW STRENGTH CONTROL

[75] Inventor: Richard N. Brown, Macungie, Pa.

[73] Assignee: General Electric Company, Bridgeport, Conn.

[21] Appl. No.: 753,557

[22] Filed: Dec. 22, 1976

[51] Int. Cl.² ............................................. A47J 31/44
[52] U.S. Cl. ........................................ 99/305; 99/299
[58] Field of Search ................. 99/300, 305, 309, 306, 99/307, 304, 283, 299; 426/433; 222/42, 486

[56] References Cited

U.S. PATENT DOCUMENTS

| 2,615,385 | 10/1952 | Smail | 99/305 |
| 3,040,648 | 6/1962 | Vieceli | 99/305 |
| 3,561,888 | 2/1971 | Jordan | 99/309 |

FOREIGN PATENT DOCUMENTS

| 738,678 | 7/1966 | Canada | 99/305 |

Primary Examiner—Harvey C. Hornsby
Assistant Examiner—Timothy Simone

Attorney, Agent, or Firm—Leonard J. Platt; George R. Powers; John F. Cullen

[57] ABSTRACT

A coffeemaker having a ground coffee basket, a brewing water spreader positioned on top of the ground coffee basket and a brewed coffee container positioned below the basket wherein a unique brew control cap is positioned on the spreader for controlling the amount of heated brewing water that is permitted to flow to the coffee grounds within the basket or is diverted through a by-pass passage to the brewed coffee container without extracting coffee from the ground coffee. A plurality of spaced openings are formed in a wall of the cap for selective registry with one, two or more spaced openings that are formed in a wall of the spreader so that movement of the wall of the cap with respect to the spreader will uncover one, two or more of the openings to permit more or less heated water to flow to ground coffee within the basket to thereby regulate the strength of the brewed coffee within the coffee container that is positioned below the coffee basket.

9 Claims, 6 Drawing Figures

STRONG

MEDIUM

LIGHT

COFFEEMAKER WITH BREW STRENGTH CONTROL

BACKGROUND OF THE INVENTION

1. Field of the Invention

This invention relates to a coffeemaker and more particularly to a unique valve for controlling the amount of heated brewing water that is permitted to flow through ground coffee within a coffee basket to thereby control the strength of the brewed coffee.

2. Description of the Prior Art

In the manufacture of electric coffeemakers it is well known that the strength of brewed coffee can be controlled by regulating the amount of heated brewing water that flows through the grounds in a coffee basket and by regulating the amount of heated brewing water that is by-passed or diverted around the coffee grounds directly to a brewed coffee container.

In a prior U.S. Pat. No. 3,068,777 to Pedalino dated Dec. 18, 1962, there is disclosed a coffee percolator having a central by-pass tube 50 for permitting some heated brewing water that flows over the top of a percolator tube 26 to flow back to the lower portion of the coffee pot without flowing through the ground coffee 44 located within a coffee basket 48. Some of the brewing water which percolates from the top of tube 26 flows onto an apertured spreader plate 58, through ground coffee 44 to extract coffee from the ground coffee, and through a perforated bottom 48 of the coffee basket into the lower portion of the coffee pot where it naturally mixes with the water that has been diverted through the by-passage 50. A sight glass valve 70 is rotatably mounted within a cover 66 of the coffee pot for controlling the relative amount of heated brewing water that flows through the by-pass passage 50 and through the ground coffee 44. It can be appreciated that by adjusting the height of the sight glass valve 70 above the spreader plate 58, the amount of heated water directed into the by-pass tube 50 is regulated in order to regulate the strength of the brewed coffee.

In a prior patent to Bender U.S. Pat. No. 3,333,527 dated Aug. 1, 1967 a drip coffeemaker is provided with overflow or by-pass holes 46 for permitting brewing water to flow to a brewed coffee container without flowing through ground coffee within a basket 16. A valve 26 is provided for controlling the discharge of hot water from the reservoir.

This invention is concerned with such electric coffeemaker brew controls, and particularly, to an improved simplified brew control construction for a drip coffeemaker.

It is a primary object of my invention to provide an improved brew control which may be readily attached to a heated water spreader that may be conveniently operated to select a strong, medium or mild coffee brew strength.

It is a further object of my invention to provide a low cost brew strength control having relatively few parts which may be readily manufactured at relatively low cost.

It is another object of my invention to provide a simplified brew control which may be readily removed from a spreader plate and a coffee basket for cleaning, and conveniently reassembled to the spreader plate and a coffee basket without the use of tools.

SUMMARY OF THE INVENTION

In accordance with one of the aspects of this invention a coffeemaker includes a ground coffee basket which is positioned above a brewed coffee container, and a heated water outlet is positioned above the ground coffee basket for providing heated water to the ground coffee within the basket. The ground coffee basket includes a conventional perforated bottom wall, a side wall and an open top. A by-pass passage extends upwardly from the bottom wall of the coffee basket for by-passing heated brewing water to the brewed coffee container. A heated water spreader is positioned generally above the ground coffee basket for receiving heated brewing water and for distributing heated water into the ground coffee within the coffee basket. The spreader includes a perforated bottom wall, an upwardly extending side wall, and a unique upwardly extending heated water control wall having a plurality of control openings formed therein. A unique slide is provided with a plurality of spaced openings for selective registry with one or more of the spaced openings formed in the control wall so that movement of the slide with respect to the control wall will uncover one, or more of the openings in the control wall to permit more or less heated water to flow to or by-pass the coffee grounds bed to thereby control the strength of the brewed coffee.

With this unique construction the slide may be conveniently operated by simply moving it with respect to control wall in order to set the brew control for making strong, medium or mild coffee.

In addition, with this unique construction a brew control for selecting strong, medium or mild coffee may be achieved with the use of one part in addition to a spreader plate and a coffee basket. All that is required is a movable slide for opening one, two, three or more openings in a uniquely constructed control wall of the spreader for permitting more or less water to flow through the control wall and then through coffee grounds in the coffee basket. Thus, an exceedingly simple yet effective and reliable coffeemaker brew control has been achieved.

Moreover, the brew control slide may be readily formed from plastic material in the shape of a circular cap that may be conveniently snap locked to a plastic spreader plate. Thus, in order to clean the parts, the control slide cap may be easily removed from the spreader by simply separating the two parts from each other by hand, and then reassembled by simply snap locking the rotatable cap to the spreader by pushing the two pieces together.

BRIEF DESCRIPTION OF THE DRAWING

Other objects and attendant advantages of the invention will be apparent from the following description taken in connection with the accompanying drawing in which.

DESCRIPTION OF THE PREFERRED EMBODIMENT

Figure 1:
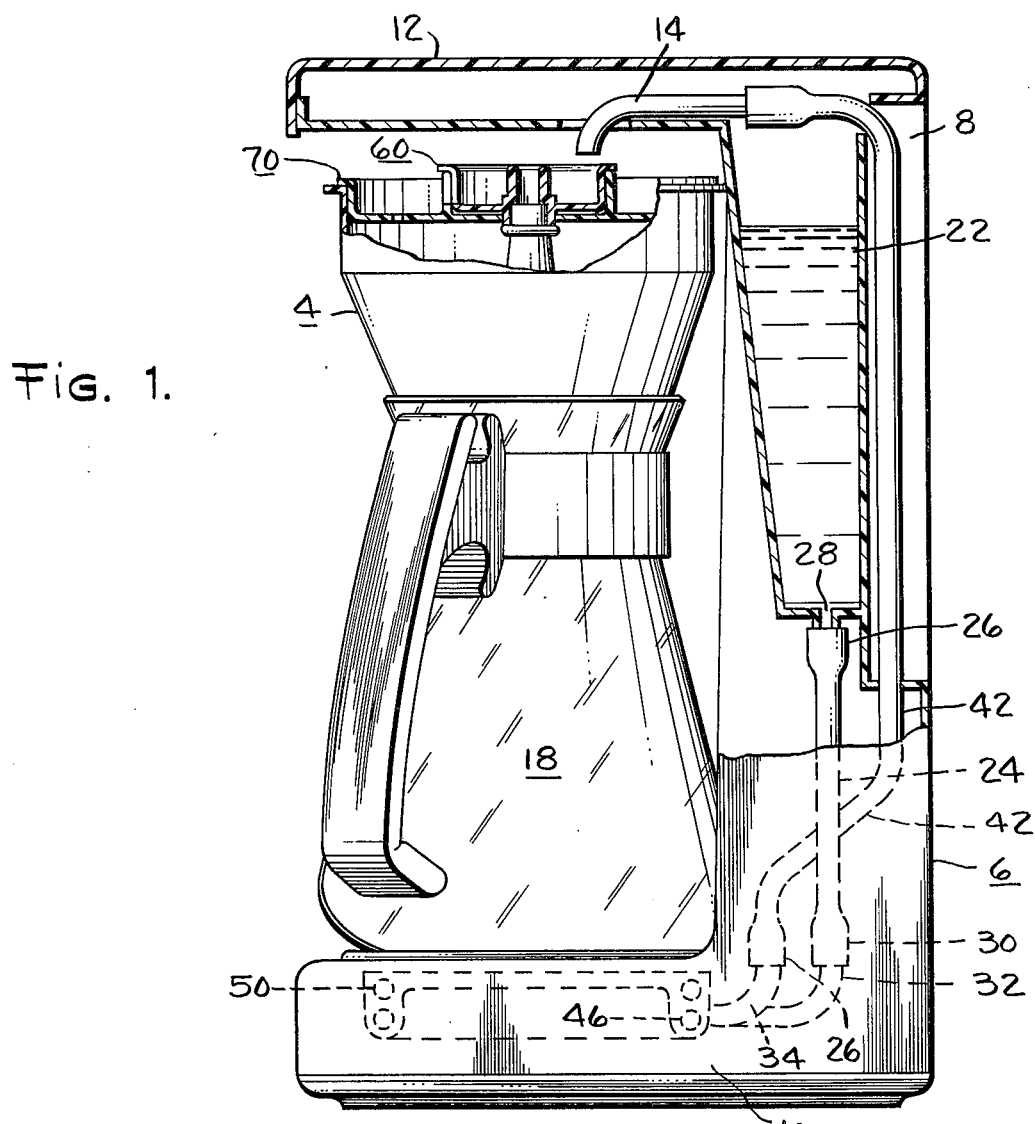
FIG. 1 is a right side elevational view of an electric coffeemaker which includes a brew control spreader constructed in accordance with my invention, portions being broken away and other portions being shown in section for illustrating the water flow path to my improved brew control spreader.
Figure 3:
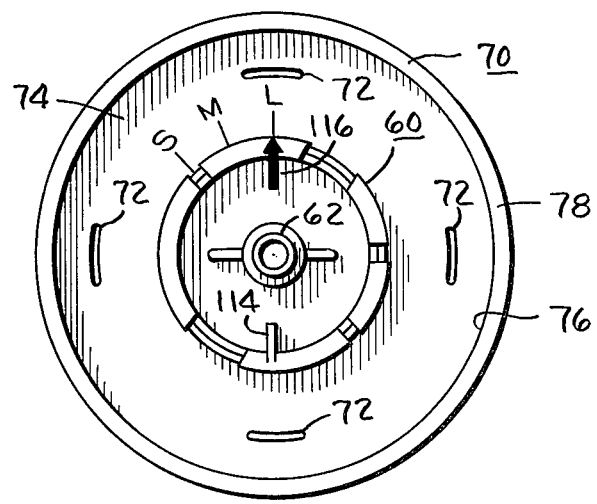
FIG. 3 is a top plan view of my improved spreader and rotatable brew control slide, the parts being shown in a light or mild brew strength position.
Figure 2:
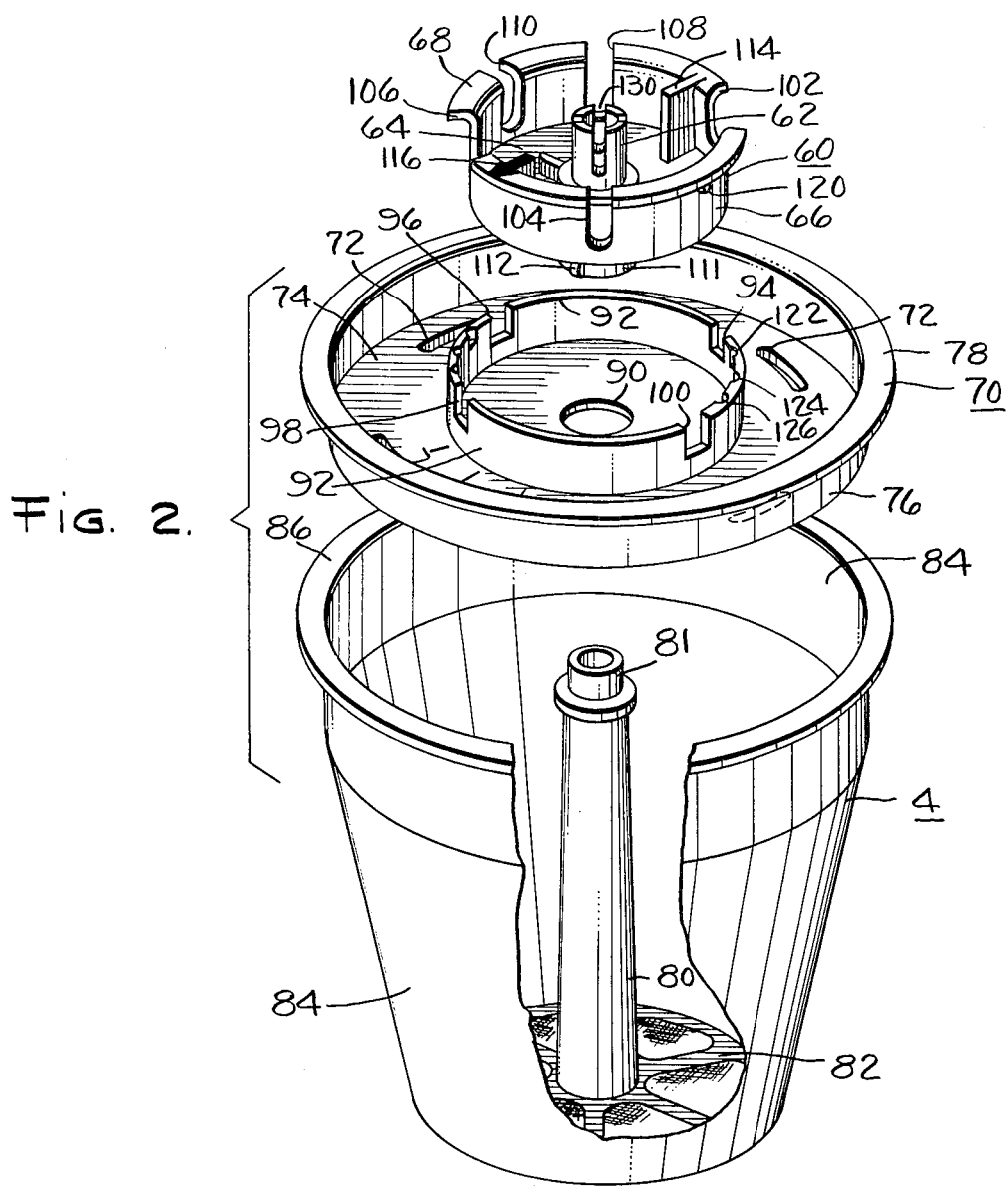
FIG. 2 is an exploded perspective view of the coffee basket, spreader and slide control cap shown in FIG. 1.

Referring now to the drawing, and first particularly to FIGS. 1 and 2 there is shown an electric drip coffeemaker which includes my unique spreader and control valve for selectively adjusting the flow of heated water through coffee grounds or a by-pass passage for making strong, medium of mild coffee. As shown, the coffeemaker includes a housing 6 having a generally hollow rear wall 8 and a hollow stand portion 10. An overhanging top wall 12 extends forwardly from the upper portion of the rear wall for housing a heated water tube 14. A carafe 18 is suitably supported on the horizontal stand portion 10 of the coffeemaker for receiving the brewed coffee from a coffee basket 4.

WATER FLOW PATH

As shown more particularly in FIG. 1, a water reservoir 22 may be integrally formed in the hollow rear wall of the coffeemaker for supplying water to a water heater 46, and then to the heated water outlet tube 14. As shown, a flexible conduit 24 may be connected at one end 26 to an outlet 28 from the water reservoir 22, and at its other end 30 to an inlet 32 of a water heater tube 46. An outlet 34 from the tube 46 extends upwardly to the left of the heater tube inlet 32 and a piece of flexible tubing 42 extends from the heated water outlet 34 upwardly behind the water reservoir 22 and is connected at its upper end portion to the heated water outlet tube 14.

A sheathed electric resistance heater 50 is positioned above the water tube 46 for heating water in the tube and for maintaining an appropriate temperature for any brewed coffee that may be in the carafe 18. The electrical heater construction for heating brewing water and for keeping the coffee warm after it has been brewed does not form a part of this invention and is described and illustrated in greater detail in my co-pending application (6D-4638), Ser. No. 702,577, filed July 6, 1976, and assigned to the same assignee as the present invention.

BREW CONTROL

In accordance with a preferred embodiment of this invention my simplified brew control selector construction includes a unique selector cap 60 that may be conveniently manually rotated to a strong, medium or light position for selecting a desired brew strength, a brew control spreader plate 70 that is especially shaped for cooperating with the brew control cap 60, and a ground coffee basket 80. As shown in FIG. 1, the selector cap 60 is connected to the spreader 70 and both the spreader and its cap 60 are positioned on top of the coffee basket 4. Thus, heated water from outlet 14 will flow onto the control cap 60, through slots in the cap 60 to the spreader plate 70, and through a plurality of apertures 72 in the spreader plate to ground coffee within the coffee basket 4 to extract coffee, and then into the brewed coffee carafe 18.

With particular reference to FIG. 2, a unique heated water by-pass passage means extends through the cap 60, through the spreader 70 and through the coffee basket 4 for diverting or by-passing some of the heated water from the heated water outlet 14 to the brewed coffee carafe 18 without extracting any coffee from the ground coffee within the coffee basket 4. In order to achieve this, the coffee basket 4 includes a generally vertical tube 80 that extends upwardly from a bottom wall 82 of the coffee basket 4 for mating with a by-pass tube 62 that may be integrally formed with my unique brew control cap for by-passing heated brewing water from the outlet tube 14 to the brewed coffee carafe or container 18.

The ground coffee basket 4 for receiving dry ground coffee may be readily formed from a low cost plastic material to include the upstanding by-pass tube 80, a circular side wall 84, and a perforated bottom wall 82. An outwardly extending annular flange 86 may be integrally formed with the plastic coffee basket 4 for conveniently holding and supporting my unique spreader plate 70.

As shown more particularly in FIG. 2, my water spreader includes a generally flat circular bottom wall 74 having a plurality of spaced apertures 72 for supplying heated water to ground coffee that may be placed in the basket between the side walls 84 and the by-pass tube 80. The spreader also includes an upwardly extending side wall 76 that is generally complementary to the inside of the side wall 84 of the coffee basket and as shown a generally circular annular flange 78 is integrally formed with the upper portion of the side wall for supporting the spreader 70 on top of the coffee basket 4. As shown more particularly in FIG. 2, a generally circular aperture 90 is formed in the bottom wall 74 of the spreader for receiving the upper end portion of the by-pass tube 80 that is integrally formed with the coffee basket 4.

In accordance with my invention, the water spreader 70 also includes an upwardly extending heated water control wall 92 that is positioned between the aperture 90 for receiving the by-pass tube 80 of the coffee basket and the side wall 76 of the spreader.

A plurality of spaced openings or slots 94, 96, 98 and 100 are formed in the control wall 92 of the spreader for cooperating with my unique brew control selector cap 60 for permitting heated brewing water to flow from the inside of the control wall 92 radially outwardly through the openings 94, 96, 98 and 100 to the annular trough that is formed between the control wall 92, bottom wall 74, and side wall 76 of the spreader. It can be appreciated that water in the trough will gradually flow through the apertures 72 in the spreader into the basket 4, through the coffee grounds within the basket, through the perforated bottom wall 82, and into carafe 18.

BREW CONTROL SELECTOR

Figure 4:
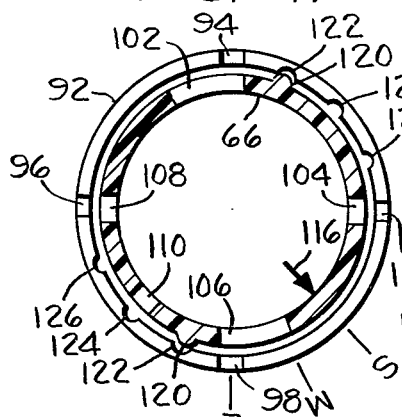
FIG. 4 is a diagrammatic view showing the brew strength control cap in its strong brew strength position.
Figure 5:
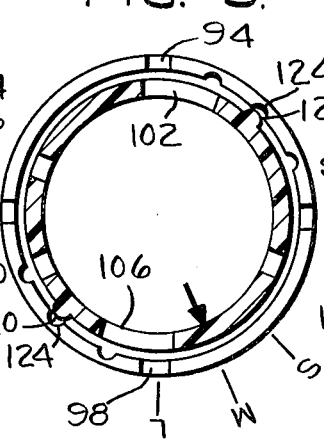
FIG. 5 is a diagrammatic view similar to FIG. 4 showing the brew strength control cap in its medium coffee position.
Figure 6:
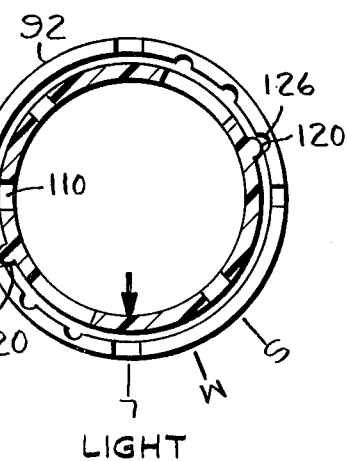
FIG. 6 is a diagrammatic view similar to FIG. 4 showing the brew strength control cap in its light or weak coffee position.

In accordance with my invention, a unique brew control cap 60 is provided for controlling the flow of heated brewing water through one or more of the slots 94, 96, 98 and 100 of the control wall of the spreader and through the by-pass passage 80 of the coffee basket 4. As shown more particularly in FIG. 2, the cap includes a generally flat bottom wall 64, a generally cylindrical circular side wall 66, and an annular upper flange 68. A plurality of slots or openings 102, 104, 106, 108 and 110 are integrally formed in the side wall 66 of the cap for selective registry with the control wall slots 94, 96, 98 and 100. With particular reference to FIG. 4, it can be appreciated that when the control cap is rotated to its strong brew position slots 102, 104, 106 and 108 in the cap will be in registry with the slots 94, 96, 98 and 100 in the control wall and a substantial amount of brewing water will flow into the annular space between the control wall 92 and the side wall 76. When the brew selector has been rotated to its medium brew position as illustrated in FIG. 5, slots 102 and 106 will be moved into registry with slots 94 and 98 in the control wall and a lesser amount of heated brewing water will be permitted to flow into the annular space between the walls 76 and 92 of the spreader. It can also be appreciated that when the brew control cap is moved to its mild position as illustrated in FIG. 6, only a single slot 110 of the cap will be moved into registry with the slot 96 in the control wall and an even lesser amount of heated brewing water will be permitted to flow into the space between the control wall 92 and side wall 76 of the spreader.

As shown more particularly in FIG. 2, the central portion of the selector cap 60 includes an integrally molded by-pass tube 62 that is shaped for coupling the tube 62 to the upper end portion 81 of the by-pass passage 80 of the coffee basket. Thus, the lower portion 111 of the tube has an inside diameter that is only slightly larger than the outside diameter of the upper end 81 of the by-pass tube 80 of the basket so that the by-pass tube 62 of the selector cap 60 may be positioned over and readily coupled to the upper portion 81 of the by-pass tube 80 that is integrally formed with the coffee basket 4. Similarly, the outer diameter of the lower portion of the cap by-pass tube 62 is slightly smaller than the circular opening 90 that is formed in the spreader 70 so that the lower portion 111 of the cap by-pass tube may be readily inserted within the circular opening 90 in the spreader 70.

A simplified construction is provided for holding the selector cap 60 for rotatable movement with respect to the spreader 70 as illustrated, a plurality of raised bead detents 112 extend radially outwardly from the lower portion 111 of the cap by-pass tube 62 and the distance from the bead 112 to the lower wall 64 of the cap is just slightly more than the thickness of the spreader bottom wall 74. Accordingly, the cap 60 may be assembled to the spreader by lining up the lower portion 111 of the overflow passage 60 with the circular aperture 90 in the spreader plate and then snapping the raised bead portion 112 through the circular aperture 90. With this construction, the bead 112 cooperates with the lower surface of the bottom wall 74 of the spreader to hold the cap for rotational movement with respect to the spreader. The entire cap 60 and spreader 70 subassembly may be lifted by simply gripping the upper portion of the overflow tube 62 without disassembling the cap from the spreader. Nevertheless, the fit between the lower bead portion 111 and 112 of the overflow tube and the circular aperture 90 in the spreader is such that when it is desired to remove the cap from the spreader for cleaning, it is merely necessary to turn the entire assembly upside down, and with finger pressure on the lower portion 110 of the overflow tube, the cap 60 may be separated from the spreader 70.

My unique control cap 60 may also include two upwardly extending gripping tabs 114, 116 for holding the control cap and rotating it to its strong, medium or mild positions with respect to the spreader 70. As illustrated, an arrow may be provided on one of the tabs 116 for pointing to S, M or L for indicating that the cap has been moved to its strong, medium or mild position.

A detent or projection 120 may be formed on an outer surface of the cap 60 for cooperating with a plurality of spaced dimples 122, 124, 126 that may be provided on the inner surface of the side wall 76 of the spreader for selectively holding the cap 60 in one of its selected positions.

With particular reference to FIG. 2, it can be seen that the upper portion of the cap by-pass tube 62 includes a plurality of generally vertical slots 130 for permitting the water within the cap to gradually flow through the slots 130 and into the bore of the overflow passage 62. Preferably, the overflow by-pass passage slots do not extend downwardly as far as the slots 94, 96, 98, 100, 102, 104, 106 and 108 that are formed in the control wall of the spreader and the slide wall 66 of the cap, and thus heated water within the spreader cannot flow through the overflow or by-pass passage 62, 80 until the water level within the cap 60 has reached the bottom surfaces of the slots 130.

OPERATION

In operation, it can be appreciated that water can be poured into the water reservoir 22 and an appropriate amount of ground coffee may be placed within the ground coffee basket 4. Water from the reservoir 22 will flow into the water heater 46, and then upwardly through the tube 42 to the heated water outlet 14. The water then flows into the cap 60 between its side wall 66 and its overflow tube 62. Heated water than gradually rises within the cap and flows through whatever slots 94, 96, 98, 100, 102, 104, 106, 108 or 110 that may be open depending on the position of the generally cylindrical slide wall 66 of the selector cap with respect to the control wall 92 of the spreader. When the water within the cap has reached a level that is higher than the lower surfaces of slots 130, the water will naturally flow through the slots 130, through the bore of overflow tube 62, and through overflow by-pass tube 80 in the coffee basket without coming in contact with the coffee grounds within the basket. Heated water that flows from the one or more of the slots 94, 96, 98, 100 and 102 to the space between the wall 92 and 76 of the spreader flows through the apertures 72 in the bottom wall of the spreader, through the ground coffee in the coffee basket, and then through the perforated bottom wall 82 of the coffee basket.

With this unique construction, it can be appreciated that I have provided brew control that may be readily and conveniently operated. The control cap 62 may be set to its desired position by simply rotating it with respect to the control wall 92 of the spreader, and the pointer on the cap cooperates with indicia on the spreader for making the operation rather self-explanatory. Moreover, a person setting the control cap 60 may readily appreciate how the brew control functions since the by-pass passage 62 and the slots 94, 96, 98, 100, 102, 104, 106, 108, and 110 are readily visible.

In view of the foregoing, it can also be appreciated that my unique brew control construction can be easily formed and manufactured at relatively low cost. The coffee basket 4 may be conveniently formed of plastic material and all of the parts including the overflow tube 80, its perforated bottom wall 82 and its side wall 84 may be integrally formed at the same time overall coffee basket is being formed. Likewise, the spreader 70 may also be formed of low cost plastic and all of the parts including its wall 76, 74 and 92, the aperture 90 and its slots 94, 96, 98, 100 may all be formed at the same time that the spreader is being molded from plastic. Since a spreader and a coffee basket are parts that are usually required in the manufacture of a drip coffeemaker, the only part that has to be added in order to achieve my unique brew control selector is the cap 62, and it can be appreciated that all of the walls, tabs, slots, and the tube of the cap may be integrally formed at the same time that the cap is being formed from plastic material. Thus, an exceedingly simple and reliable brew control spreader construction has been achieved at relatively low manufacturing cost.

What I claim is:

1. In an electric coffeemaker wherein a ground coffee basket having side wall means, bottom wall means and brewed coffee aperture means in said bottom wall means is positioned above a brewed coffee container and a heated water outlet is positioned above the ground coffee basket for providing heated brewing water to the ground coffee basket the improvement comprising:
   a. by-pass passage means extending upwardly from the bottom wall means of said coffee basket for by-passing heated brewing water to said brewed coffee container;
   b. a heated water spreader positioned generally above said ground coffee basket for receiving heated brewing water and for distributing heated water into the ground coffee basket;
   c. said spreader including a bottom wall, an upwardly extending side wall, an aperture for said by-pass passage means, an upwardly extending heated water control wall positioned between the aperture for said by-pass passage means and the side wall of the spreader, and a plurality of heated water openings extending through the bottom wall of said spreader between the heated water control wall and the side wall of the spreader for distributing heated water into the ground coffee basket;
   d. a plurality of spaced openings formed in said heated water control wall for permitting heated brewing water to flow to the heated water openings in the bottom wall of the spreader;
   e. a movable slide wall in slidable engagement with said control wall positioned between said control wall and the aperture for receiving said by-pass passage means; and
   f. a plurality of spaced openings formed in said slide wall positioned for selective registry with one, or more of the spaced openings formed in said control wall so that movement of said slide wall with respect to said control wall will uncover one, or more of the openings in said control wall to permit more or less heated water to flow through said control wall and through the heated water openings in the bottom wall of the spreader to control the relative amount of water which is permitted to flow through the coffee basket and the by-pass passage means to thereby control the strength of the liquid brewed coffee in the coffee container.

2. An electric coffeemaker as defined in claim 1, wherein the upwardly extending heated water control wall of the spreader and the movable slide wall are generally cylindrical in shape and the slide wall is rotated with respect to the control wall for uncovering one or more of the openings in the control wall to permit more or less heated water to flow through the control wall and through the heated water openings in the bottom wall of the spreader to control the relative amount of water which is permitted to flow through the coffee basket and the by-pass passage means to thereby control the strength of the liquid brewed coffee in the coffee container.

3. An electric coffeemaker as defined in claim 1 wherein four equally spaced slots are formed in the heated water control wall for permitting heated brewing water to flow to the heated water openings in the bottom wall of the spreader, and five slots are formed in the movable slide wall for selective registry with one or more of the slots that are formed in the control wall, the slots being spaced with respect with each other so that in one position of said slide wall, four slots of the slide wall are in registry with four slots of the control wall, in another rotatable position of said slide wall with respect to said control wall, two slots in the slide wall are in registry with two slots of the control wall and in a third operating position of said slide wall with respect to said control wall, only one slot of the slide wall is in registry with a slot in the control wall.

4. In an electric coffeemaker wherein a ground coffee basket having side wall means, bottom wall means and brewed coffee aperture means in said bottom wall means is positioned above a brewed coffee container and a heated water outlet is positioned above the ground coffee basket for providing heated water to the ground coffee basket the improvement comprising:
   a. by-pass passage means extending upwardly from the bottom wall means of said coffee basket for by-passing heated brewing water to said brewed coffee container;
   b. a heated water spreader positioned generally above said ground coffee basket for receiving heated brewing water and for distributing heated brewing water into the ground coffee basket;
   c. said spreader including a bottom wall, an upwardly extending side wall, an aperture for receiving said by-pass passage means, an upwardly extending heated water control wall positioned between the aperture for receiving said by-pass passage means and the side wall of the spreader, and a plurality of heated water openings extending through the bottom wall of said spreader between the heated water control wall and the side wall of the spreader for distributing heated water into the ground coffee basket;
   d. a plurality of spaced openings formed in said heated water control wall for permitting heated brewing water to flow to the heated water openings in the bottom wall of the spreader; a brew control cap having a bottom wall, an upwardly extending slide wall and an upwardly extending by-pass tube, said slide wall being in slidable engagement with said control wall and said upwardly extending by-pass tube being a portion of said by-pass passage means;
   e. said heated water outlet being positioned between said slide wall and said by-pass passage means to supply heated water between said slide wall and said by-pass passage means; and
   f. a plurality of spaced openings formed in said slide wall positioned for selective registry with one or more of the spaced openings in said control wall so that movement of said slide wall with respect to said control wall will uncover one or more of the openings in said control wall to permit more or less heated water to flow through said control wall and through the heated water openings in the bottom wall of the spreader to control the relative amount of water which is permitted to flow through the coffee basket and by-pass passage means to thereby control the strength of the liquid brewed coffee in the coffee container.

5. An electric coffeemaker as defined in claim 4, wherein a brew control cap is generally cup-shaped, the upwardly extending slide wall of the cap is generally cylindrical in shape and the by-pass tube is centrally disposed in and extends upwardly from the bottom wall of the cap.

6. An electric coffeemaker as defined in claim 5 wherein the by-pass tube in the cap extends downwardly below the bottom wall of the cap for insertion within a generally circular aperture that is formed in the bottom wall of the spreader and wherein a plurality of raised bead detents are integrally formed with and extend outwardly from the bottom of the cap by-pass tube for holding the cap onto the spreader.

7. An electric coffeemaker as defined in claim 4 wherein a plurality of dimples are formed on the control wall of the spreader and a plurality of detents are formed on the slide wall of the brew control cap for holding the brew control cap in any one of a plurality of selected positions with respect to the spreader.

8. An electric coffeemaker as defined in claim 4 wherein the portion of the by-pass passage means that extends upwardly from the bottom wall means of the coffee basket includes a generally cylindrical tube having an outside diameter that is slightly less than the inside diameter of the by-pass tube that is integrally formed with the cap so that the by-pass tube of the cap may be readily positioned over the by-pass tube of the coffee basket for delivering heated by-pass water from the by-pass tube of the cap to the by-pass tube of the coffee basket.

9. An electric coffeemaker as defined in claim 4, wherein the brew control cap includes a plurality of radially inwardly directed gripping tabs for conveniently holding the brew control cap for rotation with respect to the spreader.

* * * * *